(12) United States Patent
Nakamura et al.

(10) Patent No.: US 8,182,592 B2
(45) Date of Patent: May 22, 2012

(54) SHELL FEED TYPE GAS SEPARATION MEMBRANE MODULE

(75) Inventors: Tomohide Nakamura, Ube (JP); Nozomu Tanihara, Ube (JP); Shunsuke Nakanishi, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 332 days.

(21) Appl. No.: 12/521,745

(22) PCT Filed: Dec. 27, 2007

(86) PCT No.: PCT/JP2007/075140
§ 371 (c)(1),
(2), (4) Date: Jun. 29, 2009

(87) PCT Pub. No.: WO2008/081877
PCT Pub. Date: Jul. 10, 2008

(65) Prior Publication Data
US 2010/0326278 A1    Dec. 30, 2010

(30) Foreign Application Priority Data

Dec. 29, 2006 (JP) ................................. 2006-356810
Mar. 30, 2007 (JP) ................................. 2007-095574

(51) Int. Cl.
*B01D 53/22* (2006.01)
(52) U.S. Cl. ......... 96/8; 96/4; 96/10; 95/45; 210/321.88
(58) Field of Classification Search .............. 96/4, 6, 96/8, 10; 95/45; 210/321.88
See application file for complete search history.

(56) References Cited

U.S. PATENT DOCUMENTS

| 4,293,419 A * | 10/1981 | Sekino et al. ............ 210/321.88 |
| 4,352,736 A * | 10/1982 | Ukai et al. ........................ 96/10 |

(Continued)

FOREIGN PATENT DOCUMENTS

JP    U1 S59-154306    10/1984
(Continued)

OTHER PUBLICATIONS

Jul. 16, 2009 International Preliminary Report on Patentability and Written Opinion PCT/JP2007/075140 in 8 pages.

*Primary Examiner* — Jason M Greene
(74) *Attorney, Agent, or Firm* — Knobbe Martens Olson & Bear LLP (57) ABSTRACT

A gas separation membrane module has a vessel housing a hollow fiber element including a hollow fiber bundle consisting of a number of hollow fiber membranes (1) and a tube sheet (2) holding one end of the hollow fiber bundle. The interior of the vessel is partitioned by the tube sheet (2) into two spaces consisting of a raw gas chamber and a permeate gas chamber. A high-pressure mixed gas is fed into the raw gas chamber where gas separation is carried out. The gas separation membrane module has a configuration where during operation, the tube sheet (2) is supported by means of a perforated plate (8) in the vessel by a pressure from the mixed gas fed to maintain airtightness between the two spaces and when the tube sheet (2) receives a pressure in the reverse direction to that applied during the operation of the gas separation membrane module, the tube sheet (2) is forced to move within the vessel by the pressure in the reverse direction, thereby losing airtightness between the two spaces.

5 Claims, 7 Drawing Sheets

U.S. PATENT DOCUMENTS

| | | | | |
|---|---|---|---|---|
| 4,358,377 A | * | 11/1982 | Clark | 210/323.2 |
| 4,675,109 A | | 6/1987 | Applegate et al. | |
| 4,871,379 A | * | 10/1989 | Edwards | 96/8 |
| 5,470,469 A | * | 11/1995 | Eckman | 96/8 |
| 8,080,093 B2 | * | 12/2011 | Ito et al. | 96/6 |

FOREIGN PATENT DOCUMENTS

| | | | |
|---|---|---|---|
| JP | 61-57207 | * | 3/1986 |
| JP | A S61-57207 | | 3/1986 |
| JP | A S61-259708 | | 11/1986 |
| JP | A S63-224714 | | 9/1988 |
| JP | A H06-226062 | | 8/1994 |
| JP | 2003-159517 | * | 6/2003 |
| JP | A 2003-159517 | | 6/2003 |
| JP | A 2005-218901 | | 8/2005 |

* cited by examiner

Prior Art

SHELL FEED TYPE GAS SEPARATION MEMBRANE MODULE

This application is the U.S. National Phase under 35. U.S.C. §371 of International Application PCT/JP2007/075140, filed Dec. 27, 2007, which claims priority to Japanese Patent Application No. 2006-356810, filed Dec. 29, 2006 and Japanese Patent Application No. 2007-095574, filed Mar. 30, 2007. The International Application was published under PCT Article 21(2) in a language other than English.

TECHNICAL FIELD

The present invention relates to a shell feed type gas separation membrane module for separating gases while feeding a high-pressure gas into an outer space of a hollow fiber membrane in a vessel.

BACKGROUND ART

Gas separation membrane modules have been used in various applications because they are small and can easily separate gases by simple operation in comparison with other separating means. Gas separation can be conducted by introducing a mixed gas into a gas separation membrane module where the gas is separated into a permeate gas which has permeated the membrane and a non-permeate gas which has not permeated the membrane. The interior of the gas separation membrane module is partitioned into two spaces by the gas separation membrane. Since a gas flow rate through the gas separation membrane is proportional to a pressure difference between these two spaces (a partial pressure difference for each gas component), the mixed gas fed to the gas separation membrane module is generally pressurized.

A shell feed type gas separation membrane module, that a mixed gas is fed into the outer space of a hollow fiber membrane (gas separation membrane) in a vessel while gas separation operation, exhibits excellent pressure capability. Thus, a shell feed type gas separation membrane module can be suitably used for gas separation, particularly by feeding a high-pressure mixed gas. Patent Reference 1 has disclosed an example of a conventional shell feed type gas separation membrane module.

Figure 11:
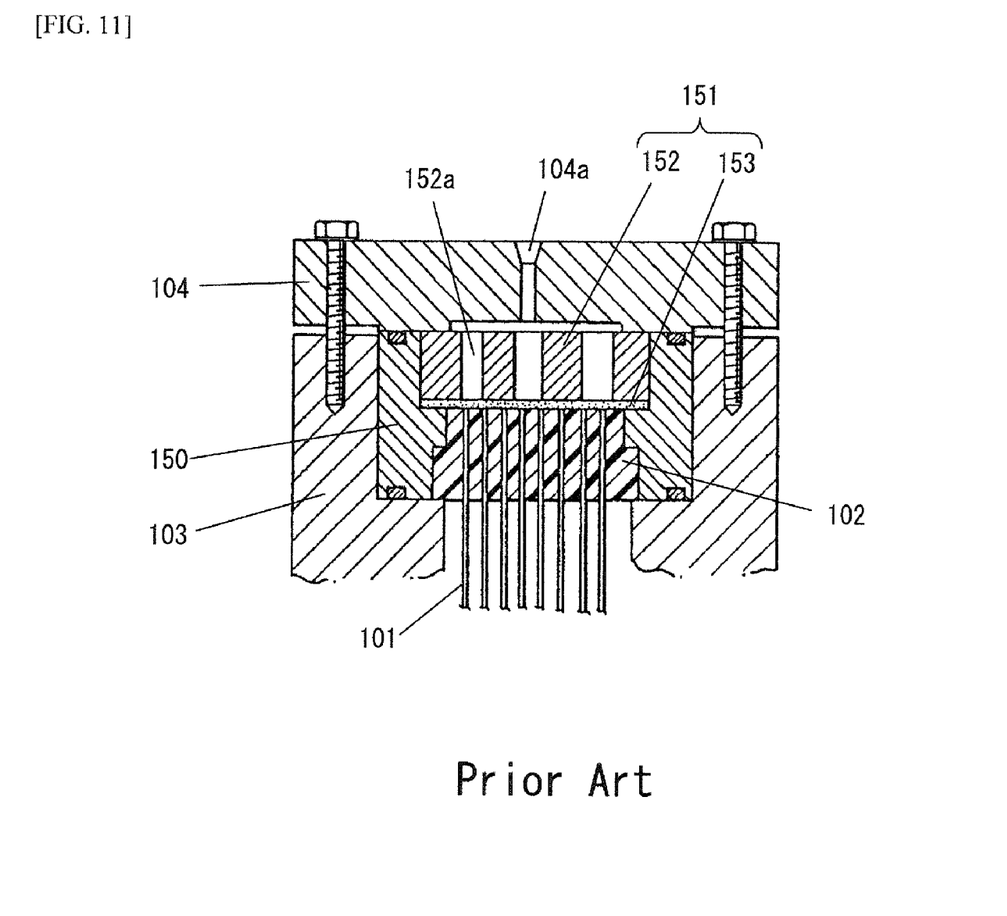
FIG. 11 is a cross-sectional view enlarging a supporting unit for a hollow fiber element in a vessel in a conventional gas separation membrane module.

We will describe a gas separation membrane module disclosed in Patent Reference 1 with reference to FIG. 11.

A gas separation membrane module shown in FIG. 11 comprises a hollow fiber element and a vessel having vessel body 103 housing the hollow fiber element and lid 104. The hollow fiber element has a number of hollow fiber membranes 101 and tube sheet 102 holding hollow fiber membranes 101 as a bundle. Tube sheet 102 is a member made of, for example, an epoxy resin, which holds hollow fiber membranes 101 by embedding one ends of hollow fiber membranes 101 such that hollow fiber membranes 101 penetrate tube sheet 102 in its thickness direction and the open-end face of hollow fiber membranes 101 are exposed from tube sheet 102.

Vessel body 103 is a tubular member having an open end to which tube sheet 102 of the hollow fiber element is attached. For attaching tube sheet 102 to vessel body 103, one end of vessel body 103 has a concave portion. Tube sheet 102 is equipped with annular member 150 for holding tube sheet 102 in the concave portion and then fitted into the concave portion, over which lid 104 is attached to vessel body 103. Thus, the peripheral edge of tube sheet 102 is sandwiched between annular member 150 and vessel body 103 for holding.

The high-pressure mixed gas is introduced into the vessel from a mixed gas inlet (not shown) formed in vessel body 103, and flows along hollow fiber membranes 101 while particular gas components permeate hollow fiber membranes 101. A gas having not permeated hollow fiber membranes 101 is discharged from the vessel via a non-permeate gas outlet (not shown) formed in vessel body 103. On the other hand, a gas having permeated hollow fiber membranes 101 is discharged from permeate gas outlet 104a formed in lid 104 via the open ends of hollow fiber membranes 101 and a permeate gas flow path between tube sheet 103 and lid 104.

During gas separation using the above gas separation membrane module, tube sheet 103 is under a high pressure toward lid 104. Thus, the gas separation membrane module has breathable holding member 151 between lid 104 and tube sheet 102, and holding member 151 supports tube sheet 102 on the side facing lid 104, to prevent damage in tube sheet 102 due to a pressure.

However, a high-pressure gas may be introduced from permeate gas outlet 104a into the gas separation membrane module, for example, due to wrong operation, and resultantly, a pressure in the reverse direction that applied during normal operation may be applied to tube sheet 102. Tube sheet 102 is just supported by the peripheral part on opposite side to the side supported by holding member 151, and therefore, the pressure in the reverse direction that applied during normal operation to tube sheet 102 may damage tube sheet 102, which may lead to movement of the whole hollow fiber element within the vessel and finally damage hollow fiber membrane 101.

Such a problem might be solved by increase in a thickness of tube sheet 102 to make tube sheet 102 stronger. Increase in a thickness of tube sheet 102, however, reduces an effective area of hollow fiber membranes 101, which leads to reduce gas separation ability of the gas separation membrane module.

Furthermore, as described above, holding member 151 disposed between lid 104 and tube sheet 102 must be breathable. Thus, the gas separation membrane module described in Patent Reference 1 comprises a holding member body 152 having a number of perforations 152a and porous layer 153 intervening between holding member body 152 and tube sheet 102, has a complex configuration. Furthermore, a resin plate (not shown) binds the ends of hollow fiber membranes 101 in the opposite side to tube sheet 102 for preventing them from being loose. When hollow fiber membranes 101 are bundled as described above, the gas separation membrane module must be handled in vertical position because hollow fiber membrane 101 tends to be ruptured in horizontal position.

Patent Reference 1: Japanese published unexamined application No. 1986-57207.

DISCLOSURE OF THE INVENTION

Subject to be Solved by the Invention

An objective of the present invention is to provide a gas separation membrane module which exhibits a good gas separation efficiency and has such an improved structure that a tube sheet is not damaged even when a pressure in the reverse direction to that applied during normal operation is applied to a hollow fiber element due to, for example, wrong operation.

Another objective of the present invention is to provide a gas separation membrane module having a simple structure, tolerant to damage in a hollow fiber element even when a high-pressure gas is introduced, and exhibiting a good gas separation efficiency.

Means to Solve the Subject

According to the present invention, there is provided a shell feed type gas separation membrane module having a vessel housing a hollow fiber element comprising of a hollow fiber bundle made of a number of hollow fiber membranes for separating gases and a tube sheet holding one end of said hollow fiber bundle, where the interior of said vessel is partitioned by said tube sheet into two spaces consisting of a raw gas chamber and a permeate gas chamber and a high-pressure mixed gas is fed into said raw gas chamber where gas separation is carried out, wherein said gas separation membrane module has a configuration where during operation of said gas separation membrane module, said tube sheet maintain airtightness between said two spaces by being supported by means of a tube sheet holder in said vessel by a pressure from the mixed gas fed, and when said tube sheet receives a pressure of reverse direction to that applied during the normal operation of said gas separation membrane module, said tube sheet is forced to move within said vessel by the pressure in the reverse direction, thereby losing airtightness between said two spaces.

According to the present invention, there is also provided a shell feed type gas separation membrane module where a high-pressure mixed gas is fed to the outer space of hollow fiber membranes capable of separating gases for performing gas separation, comprising a hollow fiber element, a vessel removably housing said hollow fiber element, and a perforated plate disposed within said vessel, wherein said hollow fiber element comprises a hollow fiber bundle formed by binding up a number of said hollow fiber membranes which are folded in U-shape such that both end openings are aligned at one end, a tube sheet to which the opening ends of said hollow fiber membranes are bonded such that the ends of said hollow fiber membranes are open, and a core tube which is disposed substantially in the center of said hollow fiber bundle and bonded to said tube sheet at one end and has an internal non-permeate gas flow path communicating with the outer space of said hollow fiber membranes within said vessel, wherein said vessel comprises a vessel body comprising an opening through which said hollow fiber element is taken in and out, a core tube holding part which holds the other end of said core tube and which guides a gas from a non-permeate gas flow path in said core tube to the outside of said vessel and a mixed gas inlet, and a lid having a permeate gas outlet for shutting the opening in said vessel body, and wherein said perforated plate is placed between said hollow fiber element and said lid such that at least a part of the surface facing the tube sheet side is in contact with said tube sheet and a non-contacting part of the surface facing the tube sheet side comprise a concave portion with a depth of 1 mm or more as a permeate gas flow path.

According to the present invention, there is also provided a shell feed type gas separation membrane module for separating gases from a high-pressure mixed gas fed to the outer space of hollow fiber membranes for separating gases, where a perforated plate is disposed in contact with the surface of a tube sheet bonded to the ends of said hollow fiber membranes such that the ends of said hollow fiber membranes are opened and a permeate gas having permeated said hollow fiber membranes is collected from the openings in said hollow fiber membranes via said perforated plate, wherein a part of the surface of said perforated plate facing said tube sheet has a concave portion with a depth of 1 mm or more as a permeate gas flow path.

Effect of the Invention

The present invention can reduce the risk of the tube sheet is damage due to a pressure applied to the tube sheet in a membrane module, without increase in a thickness of a tube sheet, with a simple structure. A gas separation membrane module of the present invention exhibits a good gas separation efficiency without decrease in an effective area of hollow fiber membranes due to increase in a thickness of the tube sheet. In particular, a gas separation membrane module having a configuration where the tube sheet is movable when it receives a pressure in the reverse direction to that applied during normal operation prevented the damage in the tube sheet due to, for example, wrong operation.

| Description of Reference Numerals | |
|---|---|
| 1 | hollow fiber membrane |
| 2 | tube sheet |
| 3 | vessel body |
| 4 | lid |

-continued

Description of Reference Numerals

| | |
|---|---|
| 5 | O-ring holding groove |
| 6 | O-ring |
| 7 | permeate gas outlet |
| 8 | perforated plate |
| 9 | stopper |
| 11 | film member |
| 12 | cap |
| 13 | auxiliary member |
| 14 | core tube |
| 15 | core tube connecting part |
| 18 | core tube holding member |
| 19 | mixed gas inlet |

BEST MODE FOR CARRYING THE INVENTION

A gas separation membrane module using hollow fiber membranes comprises a hollow fiber element having a hollow fiber bundle consisting of several hundreds to several hundreds of thousands of hollow fiber membranes capable of separating gases by permselectivity and a resin tube sheet holding the hollow fiber bundle as a bunch by bonding and embedding the hollow fiber bundle such that in at least one end of the hollow fiber bundle, the hollow fiber membranes are opened, and a vessel housing the hollow fiber element. The vessel has at least a mixed gas inlet, a permeate gas outlet and a non-permeate gas outlet. The hollow fiber element is mounted in the vessel such that the inner space of the hollow fiber membranes and the space communicating with the inner space are separated from the outer space of the hollow fiber membranes.

In such a shell feed type gas separation membrane module, a high-pressure mixed gas is fed to the outer space of the hollow fiber membranes within the vessel from the mixed gas inlet, and flows contacting the hollow fiber membranes and then is discharged from the non-permeate gas outlet. While the mixed gas flows contacting the hollow fiber membranes, particular gas components in the mixed gas selectively permeate the hollow fiber membranes. The gas components having permeated the hollow fiber membranes flows the inner space of the hollow fiber membranes and the space communicating with the inner space and is discharged from the permeate gas outlet.

A shell feed type gas separation membrane module is suitably used for separating and recovering particular gas components from a high-pressure mixed gas at about 0.1 to 30 MPa, preferably 0.2 to 25 MPa, more preferably 1 to 25 MPa as a gauge pressure. For example, a gas separation membrane module can be suitably used in applications where oxygen- or nitrogen-enriched air is separated and recovered from air or hydrogen and/or helium are separated and recovered from a mixed gas containing hydrogen and/or helium.

In the shell feed type gas separation membrane module, the tube sheet separates the inside of the vessel into the outer space of the hollow fiber membranes and the space consisting of the inner space of the hollow fiber membranes and the space communicating with the inner space. At least during gas separation, the two spaces in the vessel must be hermetically partitioned by the tube sheet. Furthermore, the resin tube sheet must tolerate a pressure from the high-pressure mixed gas fed.

Thus, the gas separation membrane module of the present invention has the following configuration for separating (and recovering) particular gas components from a mixed gas fed at a high pressure without a gas separation efficiency being reduced.

The gas separation membrane module according to the first embodiment of this invention has a vessel mounting a hollow fiber element including a hollow fiber bundle consisting of a number of hollow fiber membranes capable of separating gases and a tube sheet holding one end of the hollow fiber bundle, and the interior of the vessel is partitioned by the tube sheet into two spaces consisting of a raw gas chamber and a permeate gas chamber. The gas separation membrane module has a configuration where during operation, the tube sheet is supported by means of a tube sheet holder in the vessel by a pressure from the mixed gas fed and maintain airtightness between the two spaces, and when the tube sheet is applied a pressure in the reverse direction to that applied during the operation of the gas separation membrane module, the tube sheet is forced to move within the vessel by the pressure in the reverse direction, and loses airtightness between the two spaces.

A gas separation membrane module according to the second embodiment of the present invention is a shell feed type gas separation membrane module where a high-pressure mixed gas is fed to the outer space of a hollow fiber membrane capable of separating gases for performing gas separation, having a hollow fiber element, a vessel removably mounting the hollow fiber element, and a perforated plate disposed within the vessel, which are configured as described below. The hollow fiber element has a hollow fiber bundle formed by binding up a number of the hollow fiber membranes which are folded in U-shape such that both end openings are aligned at one end, a tube sheet to which the opening ends of the hollow fiber membranes are bonded such that the ends of the hollow fiber membranes are opened, and a core tube which is disposed substantially in the center of the hollow fiber bundle and bonded to the tube sheet at one end and has an internal non-permeate gas flow path communicating with the outer space of the hollow fiber membranes within the vessel. The vessel has a vessel body comprising an opening through which the hollow fiber element is taken in and out, a core tube holding part which holds the other end of the core tube and which guides a gas from a non-permeate gas flow path in the core tube to the outside of the vessel and a mixed gas inlet, and a lid having a permeate gas outlet for shutting the opening in the vessel body. The perforated plate is placed between the hollow fiber element and the lid such that at least a part of the surface in the tube sheet side is in contact with the tube sheet and a non-contacting part to the tube sheet in the surface facing the tube sheet has a concave portion with a depth of 1 mm or more as a permeate gas flow path.

A gas separation membrane module according to the third embodiment of the present invention is a shell feed type gas separation membrane module for separating gases from a high-pressure mixed gas fed to the outer space of a hollow fiber membrane capable of separating gases, where a perforated plate is disposed in contact with the surface of a tube sheet bonded to the ends of the hollow fiber membranes such that the ends of the hollow fiber membranes are opened and a permeate gas having permeated the hollow fiber membranes is collected from the openings in the hollow fiber membranes via the perforated plate, wherein a part of the surface of the perforated plate facing the tube sheet has a concave portion with a depth of 1 mm or more as a permeate gas flow path.

In the present invention, of the two spaces separated by the tube sheet within the vessel, the outer space of the hollow fiber membranes is referred to as a "raw gas chamber" because a mixed gas to be separated flows the space, and the space communicating with the inner space of the hollow fiber membranes is referred to as a "permeate gas chamber" because a particular gas component having permeated the hollow fiber membranes flows the space. Separating a particular gas component from a mixed gas using a gas separation membrane module is called "operation" of the gas separation membrane module.

In the present invention, the hollow fiber membrane may be made of any material which is capable of separating gases. For example, the hollow fiber membrane may be suitably made of a polymer material, particularly a polymer material which is glassy at an ordinary temperature (23° C.) including polyimides, polysulfones, polyether imides, polyphenylene oxides and polycarbonates because of good gas separation performance. Furthermore, a hollow fiber membrane made of a polymer material which is glassy at an ordinary temperature can be easily folded in U-shape when a hollow fiber bundle is formed by folding the hollow fiber membranes.

A hollow fiber bundle consisting a number of hollow fiber membranes as a bunch may or may not have an internal core tube. In the hollow fiber bundle, hollow fiber membranes may be substantially parallel to each other or may cross each other. A hollow fiber membrane can be produced by a known process. One end of the hollow fiber bundle is bonded to and embedded in the tube sheet such that one ends of the hollow fiber membranes are opened as described above. The other end of the hollow fiber bundle may be closed by bonding to and embedding in, for example, a resin member, or alternatively the hollow fiber membranes may be folded in U-shape and bundled such that both opening ends of the hollow fiber membranes are aligned at one end and be bonded to and embedded in the tube sheet such that both ends of the hollow fiber membranes are opened. Alternatively, the periphery of the hollow fiber bundle may be covered by a net or film member or the hollow fiber bundle may be bundled by an appropriate tying material, and such a procedure is suitable because it can facilitate handling by preventing the hollow fiber bundle from being loose.

The tube sheet used in the present invention embeds and holds the hollow fiber bundle such that the ends of the hollow fiber membranes are opened, and can be suitably made of a thermoplastic resin such as polyethylene and polypropylene or a thermosetting resin such as an epoxy resin and a polyurethane resin. Furthermore, tube separates the space within the vessel into the raw gas chamber and the permeate gas chamber, preferably in combination with airtightness means.

The vessel used in the present invention preferably has a vessel body housing the hollow fiber element and a lid for enclosing the hollow fiber element. The vessel body has an opening for inserting the hollow fiber element, a non-permeate gas outlet for discharging a non-permeate gas and a mixed gas inlet for introducing a mixed gas, and is preferably made of a material which is resistant to a mixed gas to be treated. The lid equipped with the permeate gas outlet for discharging a permeate gas is disposed such that it shuts the opening of the vessel body and is preferably fastened to the vessel body by fastening means such as volts and nuts. Preferably, between the lid and the vessel body, airtight-sealing means such as an O-ring is disposed for ensuring airtightness in the interior of the vessel. Furthermore, since a high-pressure mixed gas is introduced into the vessel, the vessel, particularly the vessel body is preferably made of a composite material such as a metal material and a fiber-reinforced resin for adequate mechanical strength.

A tube sheet holder used in the present invention has a function to support the tube sheet when the tube sheet receives a pressure toward the permeate gas chamber during operation of the gas separation membrane module, and may have any form which does not hamper the flow of a permeate gas. Examples of the form of the tube sheet holder include a bump formed in the vessel body for receiving the periphery of the tube sheet, a part of the lid which acts as a tube sheet holder when contacting with the tube sheet and a perforated plate placed between the tube sheet and the lid. Among these, particularly preferred is a perforated plate placed between the tube sheet and the lid.

The tube sheet receives a pressure in the raw gas chamber side during operation of the gas separation membrane module. In this case, the tube sheet holder prevents the tube sheet from moving. However, in one aspect of the present invention, when the tube sheet receives a pressure in the reverse direction to that applied during operation of the gas separation membrane module, that is, when the tube sheet receives a pressure equal to or higher than a certain pressure in the surface of the permeate gas chamber side, the tube sheet moves within the vessel from the permeate gas chamber side to the raw gas chamber side, so that airtightness between the raw gas chamber and the permeate gas chamber is lost. In other words, when a pressure of the permeate gas chamber is increased, a pressure higher than a certain pressure initiates movement of the tube sheet toward the raw gas chamber. A "certain pressure" is, but not limited to, preferably a pressure of 0.001 MPa to an initial pressure of the mixed gas (gauge pressure), more preferably a pressure of 0.001 MPa to 10 MPa (gauge pressure), more preferably 0.001 MPa to 2 MPa (gauge pressure), particularly preferably 0.001 MPa to 0.5 MPa (gauge pressure).

For example, when the tube sheet does not moved till it receives a high pressure of 10 MPa or more to lose airtightness, the tube sheet has been probably damaged by a high pressure in the reverse direction to that applied during operation before the movement. When the tube sheet receives a high pressure in the reverse direction to that applied during operation, some measures must be taken for improving resistance to pressure in the tube sheet to prevent the tube sheet being damaged; for example, increase in a thickness of the tube sheet. Increase in a thickness of the tube sheet is, however, not preferable because an effective area of the hollow fiber membranes is reduced.

In contrast, when the tube sheet moves, for example, at a low pressure of 0.5 MPa or less to lose airtightness, requirement for resistance to pressure in tube sheet can be advantageously moderated, allowing the tube sheet to be thin and thus resulting in increase in an effective area of the hollow fiber membranes.

A pressure at which movement of the tube sheet is started can be appropriately set by, for example, adjusting a gap between the tube sheet and the vessel body or adjusting a thickness or hardness of the O-ring.

In a gas separation membrane module having a configuration where the tube sheet moves when the tube sheet receives a pressure in the reverse direction to that applied during operation, it is preferable that a stopper is placed for limiting a moving distance of the tube sheet for preventing the hollow fiber membranes to be damaged due to long-distance movement of the tube sheet. The stopper may have any configuration as long as it can stop movement of the tube sheet at a predetermined position; for example, convenient and preferred is that a bump or a protrusion which the moving tube sheet abuts against are formed in the inner surface of the vessel body. When the stopper is a bump or protrusion formed in the vessel body, it is preferable that an abutting part in each of the tube sheet and the stopper is tapered to increase a contact area of the tube sheet with the stopper, in order to reduce a pressure applied to the tube sheet when the tube sheet abuts against the stopper In the present invention, airtight-sealing means contacts members the tube sheet and the vessel body facing the tube sheet when the tube sheet is at its operation position to keep airtightness between the raw gas chamber and the permeate gas chamber. When the tube sheet receives a high pressure in the reverse direction to that applied during operation, the tube sheet moves toward the raw gas chamber, so that airtight-sealing means come to have no contact with the member such as the vessel body which the means has contacted, resulting in loss of airtightness between the raw gas chamber and the permeate gas chamber. There are no particular restrictions to airtight-sealing means as long as it has the above function; for example, an O-ring or V-packing can be suitably used. Airtight-sealing means may be in contact with or not in contact with the tube sheet, depending on, for example, movement of the tube sheet, and it is desirable that even after these states are repeated, airtightness between the raw gas chamber and the permeate gas chamber is kept when the means contacts the tube sheet. Airtight-sealing means may be, therefore, suitably an elastomeric resin O-ring or V-packing which can tolerate repetitive use.

In a gas separation membrane module of the present invention, when the hollow fiber element is housed in the cylindrical vessel body, an annular auxiliary member intervenes between the inner surface of the vessel body and the outer surface of the tube sheet for facilitating fitting of the tube sheet to the vessel body. There may be formed a structure for holding airtight-sealing means in the inner surface of the vessel body or the tube sheet such as an O-ring holding groove, but the inner surface of the vessel body having a large area cannot be processed with a high degree of accuracy and accurate processing of the tube sheet may be also difficult. Thus, the auxiliary member intervening between the vessel body and the tube sheet as described above allows a structure for holding airtight-sealing means to be precisely and easily formed in the auxiliary member, which resultantly facilitates keeping good airtightness between the raw gas chamber and the permeate gas chamber.

When an auxiliary member is disposed between the vessel body and the tube sheet, it is preferable that the auxiliary member is fixed in the inner surface of the vessel body and the tube sheet moves in relation to the auxiliary member. Here, because of the above reason, it is preferable that the structure for holding airtight-sealing means is formed in the inner surface of the auxiliary member and airtight-sealing means is placed in the region where the inner surface of the auxiliary member faces the outer surface of the tube sheet. Furthermore, it is also preferable that the stopper for limiting a moving distance of the tube sheet is formed as a separate member in the auxiliary member or the tube sheet holder is combined with the auxiliary member, and it is further preferable that a hollow fiber element has a configuration where an integrated unit of the auxiliary member, the stopper and the tube sheet holder as described above is combined with the hollow fiber bundle and the tube sheet.

There will be described some specific examples of a structure of a gas separation membrane module of the present invention with reference to the drawings.

Figure 1:
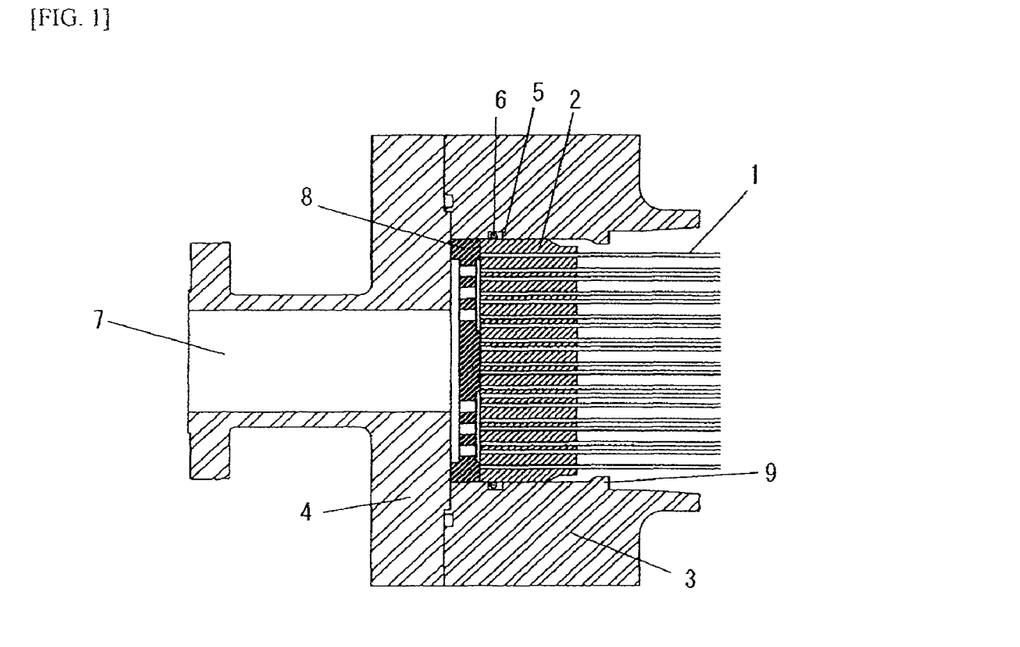
FIG. 1 is a cross-sectional view enlarging a supporting unit for a hollow fiber element in a vessel in a gas separation membrane module according to one embodiment of the present invention.

Referring to FIG. 1, a cross-sectional view enlarging a supporting unit for a hollow fiber element in a vessel in a gas separation membrane module according to one embodiment of the present invention which has a hollow fiber element and a vessel housing the hollow fiber element is shown.

The hollow fiber element has a hollow fiber bundle consisting of a number of hollow fiber membranes 1 capable of separating gases and tube sheet 2 holding the hollow fiber bundle as a bunch by bonding at least one end of the hollow fiber bundle. Hollow fiber membranes 1 penetrate tube sheet 2 while exposing their end surfaces and embedded and held in tube sheet 2 such that the end surface is open. The vessel has cylindrical vessel body 3 and lid 4 which is removably attached to one end of vessel body 3. Vessel body 3 has a mixed gas inlet (not shown) and a non-permeate gas outlet (not shown). Lid 4 has permeate gas outlet 7. The hollow fiber element is housed in the space delimited by vessel body 3 and lid 4.

Between tube sheet 2 and lid 4, perforated plate 8 serving as a breathable tube sheet holder is placed. Tube sheet 2 is mounted within vessel body 2 in one end of vessel body 3, and during operation of the gas separation membrane module, tube sheet 2 is supported by the action of a pressure of the mixed gas in the raw gas chamber which press the plate against perforated plate 8.

Perforated plate 8 has a plurality of perforations in its thickness direction, and acts not only as a structural unit but also as a gas flow path. Perforated plate 8 may be suitably made of, but not limited to, a metal, a resin, a ceramic or the like. Perforations may have any shape including a complex shape such as a circuit as long as they pass thorough perforated plate 8, and in the light of processability, has a cylindrical, conical or elliptic cylindrical shape having a diameter (maximum diameter) of preferably about 1 mm to 50 mm, more preferably about 2 mm to 20 mm.

Perforated plate 8 intervenes between tube sheet 2 and lid 4, and together with lid 4, receives a pressure from tube sheet 2 to act as a structure for preventing tube sheet 2 from deforming. Perforated plate 8 is, therefore, mounted such that at least a part of the plate is in contact with tube sheet 2 to support tube sheet 2.

Another function of perforated plate 8 is ensuring a flow path for a permeate gas discharged from hollow fiber membrane 1 disposed in the surface of tube sheet 2, through which the permeate gas is guided to permeate gas outlet 7 in lid 4 and discharged out of the vessel. Thus, a concave portion is suitably formed with a depth of 1 mm or more, preferably 1 mm to 10 mm, more preferably 2 mm to 5 mm in the surface of perforated plate 8 facing tube sheet 2. This concave portion forms a permeate gas flow path which is not contact with tube sheet 2 at a distance of at least 1 mm or more. This permeate gas flow path faces the openings of hollow fiber membranes 1 and communicates with the perforations in perforated plate 8, so that the inner space of hollow fiber membrane 1 is communicated with permeate gas outlet 7 in lid 4 via the permeate gas flow path formed by the concave portion in perforated plate 8 and the perforations.

It is furthermore preferable that the concave portion forming the permeate gas flow path in perforated plate 8 is disposed facing a region having the openings of the hollow fiber membranes 1 in tube sheet 2 while perforated plate 8 contacts tube sheet 2 in a region where the openings of hollow fiber membranes 1 are absent. It is also preferable that the surface of perforated plate 8 facing lid 4 has a region contacting lid 4 and a permeate gas flow path formed by the concave portion with a depth of 1 mm or more as described for the surface facing tube sheet 2, in order for a gas passing perforated plate 8 to smoothly flow toward permeate gas outlet 7.

It is preferable that perforated plate 8 is in contact with the center and the periphery of tube sheet 2 both for functioning as a structure for preventing deformation of tube sheet 2 and for ensuring a permeate gas flow path. Thus, adequate resistance to pressure can be ensured in the tube sheet. Here, lid 4 preferably contacts perforated plate 8 only in its periphery.

Lid 4 supports tube sheet 2 via perforated plate 2 against a pressure applied when a high-pressure mixed gas is introduced into the vessel. It is, therefore, preferable that lid 4, which in a part of the surface facing perforated plate 2, preferably in the periphery of the surface facing perforated plate 8, contacts and supports perforated plate 8. Lid 4 has, if necessary, a bolt or bolt-hole and lid 4 and vessel body 3 are suitably by such fastening means. It is suitable that the contact surface between lid 4 and perforated plate 8 is disposed such that the permeate gas discharged through the perforations in perforated plate 8 is exclusively guided to permeate gas outlet 7 (in particular, the contact surface is limited to the peripheral region of perforated plate 8).

In the inner surface of vessel body 3, O-ring holding groove 5 is formed and O-ring 6 serving as airtight-sealing means is disposed in this O-ring holding groove 5. O-ring holding groove 5 is formed in a region of the inner surface of vessel body 3 facing the outer surface of tube sheet 2 at the position of operation of the gas separation membrane module, and can hold O-ring 6 at this position. During operation of the gas separation membrane module, O-ring 5 is tightly attached to the outer surface of tube sheet 2 over the entire periphery of tube sheet 2, and O-ring 6 ensures complete airtightness between the raw gas chamber and the permeate gas chamber during operation of the gas separation membrane module. Furthermore, tube sheet 2 can move along the axis direction of vessel body 3 overcoming a static frictional force with O-ring 6 tightly attaching to its outer surface. Thus, in the region where vessel body 3 faces the outer surface of tube sheet 2, it is preferable that between the inner surface of vessel body 3 and the outer surface of tube sheet 2, there is an adequate gap to allow tube sheet 2 to move.

Stopper 9 can be formed in the inner surface of vessel body 3 for limiting a moving distance of tube sheet 2 toward the raw gas chamber. Stopper 9 can be formed as a convex part protruding from the inner surface of vessel body 3 at the position where it abuts against tube sheet 2 when tube sheet 2 moves toward the raw gas chamber until the outer surface of tube sheet 2 is separated from O-ring 6.

During operation of the gas separation membrane module, a high-pressure mixed gas containing various components is fed from the mixed gas inlet to the raw gas chamber, flows while contacting hollow fiber membrane 1, and then is discharged from the non-permeate gas outlet. During the process, a particular gas component contained in the mixed gas selectively permeates hollow fiber membrane 1 to the inner space of hollow fiber membranes 1, is then collected through the open ends of hollow fiber membranes 1 to the permeate gas chamber, and is finally discharged from permeate gas outlet 7. A pressure of the mixed gas is generally 1 to 30 MPa (gauge pressure), and a pressure difference between the raw gas chamber and the permeate gas chamber is generally 1 to 20 MPa (gauge pressure). Due to this pressure difference, tube sheet 2 receives a pressure in a direction from the raw gas chamber to the permeate gas chamber. However, the surface of tube sheet 2 facing the permeate gas chamber is pressed to perforated plate 8, and the substantially whole area of the surface is supported by perforated plate 8. Therefore, a high pressure from the raw gas chamber does not cause local deformation of tube sheet 2 and damage to tube sheet 2 can be prevented.

When a gas is introduced from permeate gas outlet 7 by, for example, wrong operation, a pressure in the permeate gas chamber becomes higher than a pressure in the raw gas chamber, and thus tube sheet 2 receives a pressure in a direction from the permeate gas chamber to the raw gas chamber, that is, a pressure in the reverse direction to that applied during operation. When tube sheet 2 receives a pressure in the reverse direction to that applied during operation, tube sheet 2 moves toward the raw gas chamber (in this figure, a direction from the left to the right) until it abuts against stopper 9. After tube sheet 2 moves to the position at which it abuts against stopper 9, the outer surface of tube sheet 2 is separated from the position of O-ring 6, resulting in loss of airtightness between the raw gas chamber and the permeate gas chamber.

Figure 2:
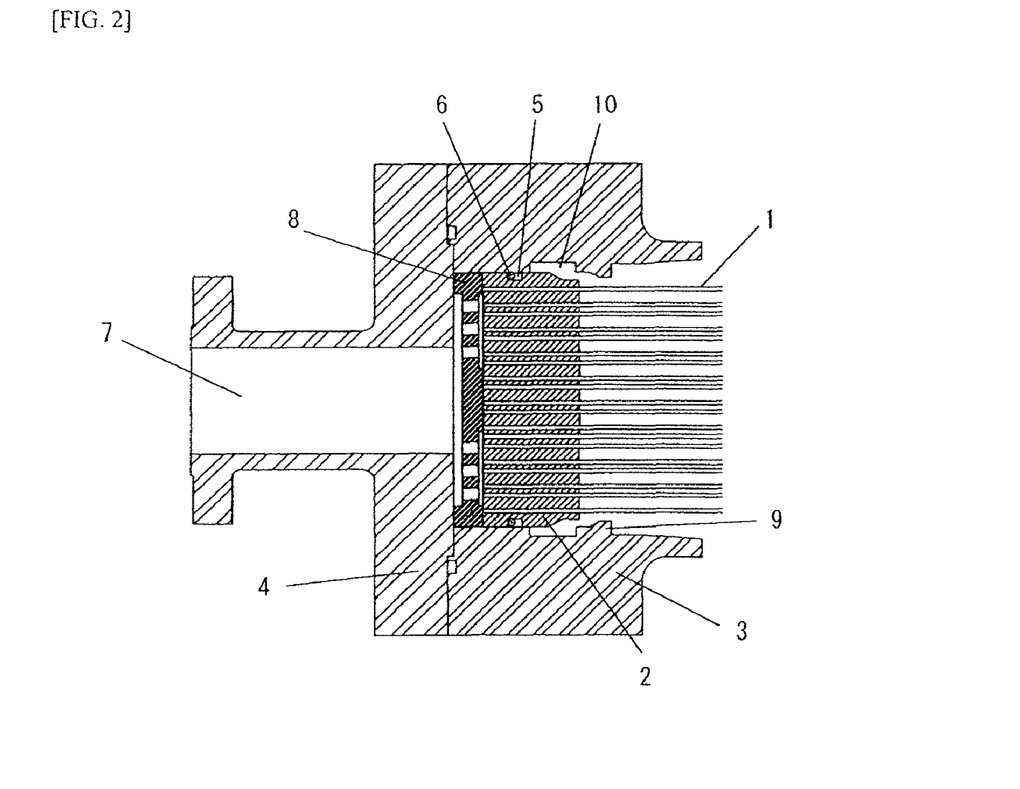
FIG. 2 is a cross-sectional view enlarging a supporting unit for a hollow fiber element in a vessel in a variation of the gas separation membrane module shown in FIG. 1.

FIG. 2 is a cross-sectional view enlarging a supporting unit for hollow fiber elements in a vessel in a variation of the gas separation membrane module shown in FIG. 1.

In the example shown in FIG. 2, O-ring holding groove 5 is formed in the outer surface of tube sheet 2 and O-ring 6 as airtight-sealing means is held in the groove, so that airtightness is maintained between the raw gas chamber and the permeate gas chamber during operation of the gas separation membrane module. In the inner surface of vessel body 3, concave portion 10 is formed along the circumferential direction over the entire periphery. Concave portion 10 is formed in a region between the position at which O-ring 6 is tightly attached to the inner surface of vessel body 3 during operation of the gas separation membrane module and the position of stopper 9, which faces O-ring 6 when tube sheet 2 abuts against stopper 9. Concave portion 10 has a depth such that when tube sheet 2 is placed at the position where O-ring 6 faces concave portion 10, O-ring 6 has no contact with vessel body 3. The other elements are as described for the example shown in FIG. 1, and are thus denoted by the same symbols as those in FIG. 1, which will not be described.

In this example, when tube sheet 2 receives a pressure in the reverse direction to that applied during operation due to wrong operation, the pressure causes tube sheet 2 to move toward the raw gas chamber to the position at which it abuts against stopper 9. As tube sheet 2 moves, O-ring 6 comes to have no contact with the inner surface of vessel body 3, resulting in loss of airtightness between the raw gas chamber and the permeate gas chamber.

Figure 3:
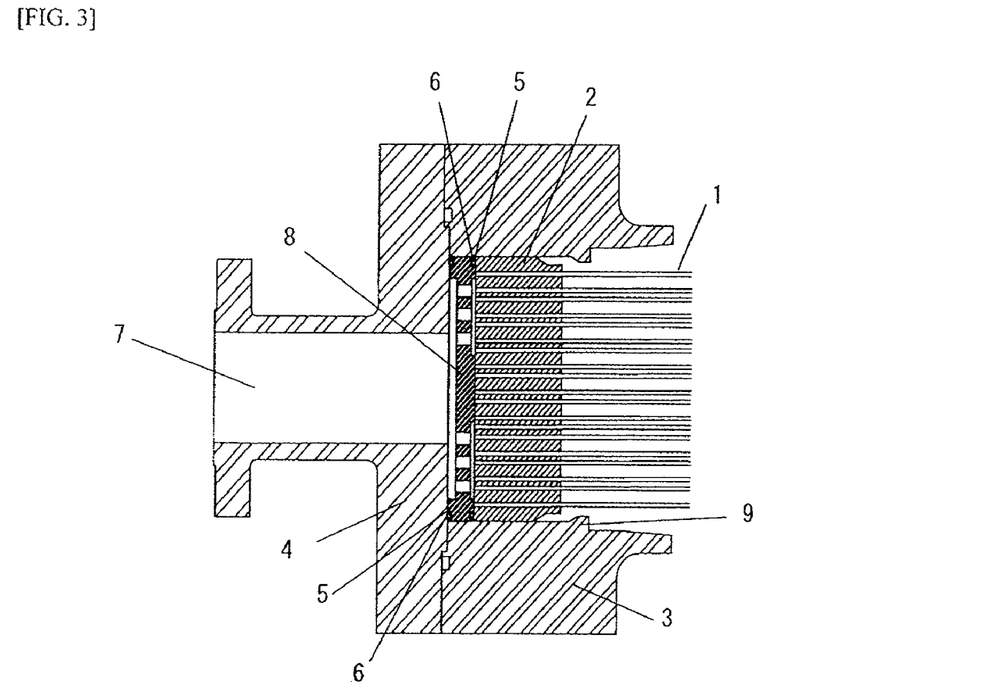
FIG. 3 is a cross-sectional view enlarging a supporting unit for a hollow fiber element in a vessel in another variation of the gas separation membrane module shown in FIG. 1.

FIG. 3 is a cross-sectional view enlarging a supporting unit for hollow fiber elements in a vessel in another variation of the gas separation membrane module shown in FIG. 1.

In the examples shown in FIG. 3, O-rings 6 as airtight-sealing means are disposed in a region where tube sheet 2 faces perforated plate 8 and a region where tube sheet 2 faces lid 4, and this configuration ensures that airtightness is maintained between a raw gas chamber and a permeate gas chamber during operation of the gas separation membrane module. Although O-ring holding grooves 5 for holding O-rings 6 are formed in perforated plate 8 in this example, they may be formed in either of two members facing each other (lid 4 and perforated plate 8, and perforated plate 8 and tube sheet 2). The other elements are as described for the example shown in FIG. 1, and are thus denoted by the same symbols as those in FIG. 1, which will not be described.

In this example, when tube sheet 2 receives a pressure in the reverse direction to that applied during operation due to wrong operation, the pressure causes tube sheet 2 to move toward the raw gas chamber to the position at which it abuts against stopper 9. When tube sheet 2 is separated from perforated plate 8 as tube sheet 2 moves, O-rings 6 come to have no contact with perforated plate 8 or tube sheet 2, resulting in loss of airtightness between the raw gas chamber and the permeate gas chamber.

Figure 4:
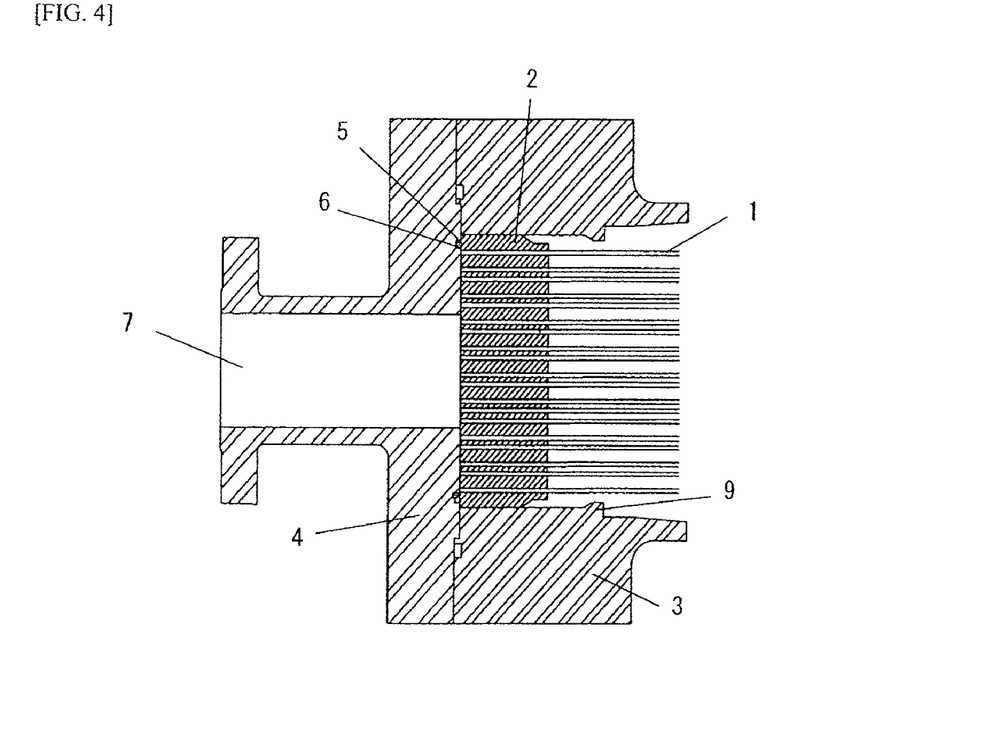
FIG. 4 is a cross-sectional view enlarging a supporting unit for a hollow fiber element in a vessel in a further variation of the gas separation membrane module shown in FIG. 1.

FIG. 4 is a cross-sectional view enlarging a supporting unit for hollow fiber elements in a vessel in a further variation of the gas separation membrane module shown in FIG. 1.

In the example shown in FIG. 4, a perforated plate is not used and tube sheet 2 is directly supported by lid 4 and lid 4 also acts as a tube sheet holder. O-ring 6 as airtight-sealing means is disposed in a region where tube sheet 2 faces lid 4, and this configuration ensures that airtightness is maintained between a raw gas chamber and a permeate gas chamber during operation of the gas separation membrane module. Although O-ring holding groove 5 for holding O-ring 6 is formed in lid 4 in this example, it may be formed in tube sheet 2. The other elements are as described for the example shown in FIG. 1, and are thus denoted by the same symbols as those in FIG. 1, which will not be described.

In this example, when tube sheet 2 receives a pressure in the reverse direction to that applied during operation due to wrong operation, the pressure causes tube sheet 2 to move toward the raw gas chamber to the position at which it abuts against stopper 9. When tube sheet 2 is separated from lid 4 as tube sheet 2 moves, O-ring 6 comes to have no contact with lid 4 or tube sheet 2, resulting in loss of airtightness between the raw gas chamber and the permeate gas chamber.

As described above, in the examples shown in FIGS. 1 to 4, tube sheet 2 moves by the action of a pressure in the reverse direction to that applied during operation so that airtightness is lost between two spaces divided by tube sheet 2 in the vessel. Consequently, a gas in the permeate gas chamber leaks into the raw gas chamber, leading to reduction in a pressure difference between the permeate gas chamber and the raw gas chamber. Thus, a force applied to tube sheet 2 is reduced, and damage in tube sheet 2 can be prevented.

When wrong operation is corrected and normal operation is restored after tube sheet 2 moves as described above, that is, when the system is altered to introduction of a mixed gas from the mixed gas inlet, a pressure in the raw gas chamber becomes higher than that in the permeate gas chamber and the pressure difference causes tube sheet 2 to return to its original position.

Next, other embodiments of a gas separation membrane module according to the present invention will be described with reference to FIGS. 5 to 9.

Figure 5:
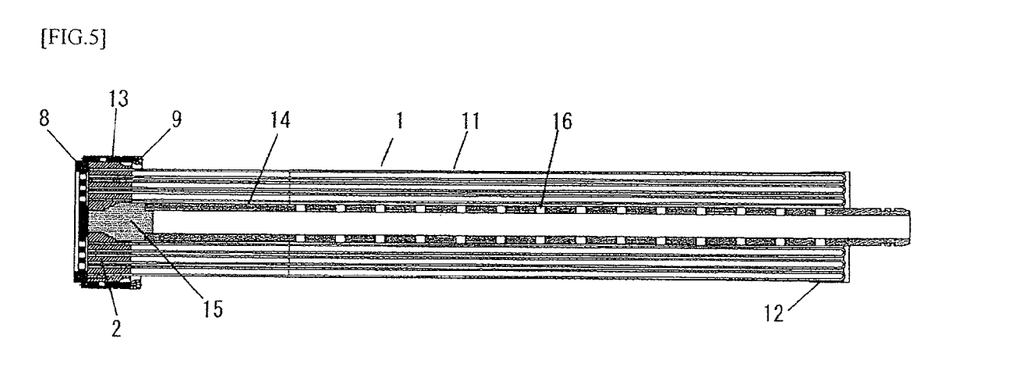
FIG. 5 is a cross-sectional view of an example of a hollow fiber element in a gas separation membrane module according to another embodiment of the present invention.

FIG. 5 is a cross-sectional view of an example of a hollow fiber element in a gas separation membrane module according to another embodiment of the present invention. In the hollow fiber element shown in FIG. 5, a number of hollow fiber membranes 1 are folded in U-shape at their center in a longitudinal direction and bundled such that the both end openings are aligned at one end, and the one ends are embedded in and bonded to tube sheet 2 such that the ends of hollow fiber membranes 1 are open. Near the center of tube sheet 2, core tube connecting part 15 made of a resin penetrates tube sheet 2 in a thickness direction and integrated with tube sheet 2. One end of core tube connecting part 15 protrudes from tube sheet 2, and core tube 14 is attached to the protruded portion. Core tube 14 can be attached to core tube connecting part 15 by forming thread parts in both connecting parts and screwing together these thread parts. By attaching core tube 14 to core tube connecting part 15, core tube 14 is disposed along a longitudinal direction of hollow fiber membranes 1 near the center of the hollow fiber bundle. In the lateral side of core tube 14, a plurality of perforations 16 are formed. Core tube 14 has such a length that its open end, that is, the end opposite to the end to which core tube connecting part 15 is connected, protrudes from the hollow fiber bundle. Core tube 14 may be, for example, made of a metal such as an aluminum alloy.

The periphery of the hollow fiber bundle is preferably covered by substantially gas impermeable film member 11 in most region except a region near tube sheet 2 (60% or more, particularly 80% or more longitudinal region of the hollow fiber bundle, and the end surface in the folded side). In the examples shown in the figure, about 70% of the longitudinal region hollow fiber bundle is covered by film member 11.

Furthermore, the region in the hollow fiber bundle which is not covered by film member 11 (the region between tube sheet 2 and film member 11 in a longitudinal direction of the hollow fiber bundle) is preferably covered by, for example, a gas permeable net. By covering the periphery of the hollow fiber bundle by the film member 11 or a net as described above, the hollow fiber bundle can be easily handled, preventing it from being loose.

Film member 11 may be made of any material which is impermeable to a gas, and is suitably made of, for example, a polymer film or a metal foil. Film member 11 controls mixed gas flow in the vessel and maintains a shape of core tube 14 and the surrounding hollow fiber bundle as an integral structural unit.

The net covering the region of the hollow fiber bundle which is not covered by film member 11 may be a gas-permeable sheet, particularly a sheet having a porosity of 30 vol % or more, preferably 50 vol % or more. Therefore, the net is not necessarily in a net-like fashion. The net may be a fabric, textile, cloth or net-like sheet made of a fiber, polymer, paper or metal material, and among these, preferably an elastic net-like material. The net maintains a shape of core tube 14 and the surrounding hollow fiber bundle as an integral structural unit without inhibiting gas permeation, particularly prevents hollow fiber membranes 1 from fluctuating due to gas flow fluctuation. Thus, the end of the net facing tube sheet 2 is preferably embedded in and bonded to tube sheet 2 together with the hollow fiber membranes 1.

Furthermore, in the end where hollow fiber membranes 1 are folded in U-shape, it is preferable that film member 11 covered by the hollow fiber bundle is tightly bonded to core tube 14, maintaining airtightness. It is, therefore, preferable that the end where hollow fiber membranes 1 are folded in U-shape is covered by, in addition to film member 11, cap 12 preformed from a gas-impermeable resin or metal. Since cap 12 also supports film member 11 as a structure, it is suitably made of a mechanically strong resin or metal such as stainless steel. When cap 12 is used, it is preferable that airtightness is maintained by using an adhesive or sealant for holding cap 12 to core tube 14 and film member 11 or using screw type or fitting type connecting means. When an adhesive or sealant is used for holding of cap 12, it is preferable that the U-shaped ends of hollow fiber membranes 1 are also embedded by the adhesive or the sealant for improving airtightness and for holding the U-shaped ends of hollow fiber membranes 1.

Core tube 14 is positioned substantially in the center of the hollow fiber bundle and has a function to prevent the hollow fiber element from deforming and to maintain its shape by integrating film member 11, an optional net, and the hollow fiber bundle. One end of core tube 14 is preferably bonded to tube sheet 2. Tube sheet 2 can be bonded to core tube 14 via a core tube connecting part 15 as described above, or by embedding core tube 14 itself in tube sheet 2.

Within core tube 14, there is formed a non-permeate gas flow path through which a non-permeate gas which have not permeated hollow fiber membranes 1 flows. The non-permeate gas flow path constitutes at least a part of the gas flow path through which the outer space of hollow fiber membranes 1 in the vessel is communicated with the space outside of the vessel. Thus, in the lateral side of core tube 14, there is formed at an appropriate position one or more perforations 16, through which the outside and the inside of core tube 14 are communicated. The end of core tube 14 opposite to the side bonded to tube sheet 2 constitutes a non-permeate gas outlet extending longer than the hollow fiber bundle. The non-permeate gas outlet is preferably formed by keeping the end of core tube 14 open.

Figure 6:
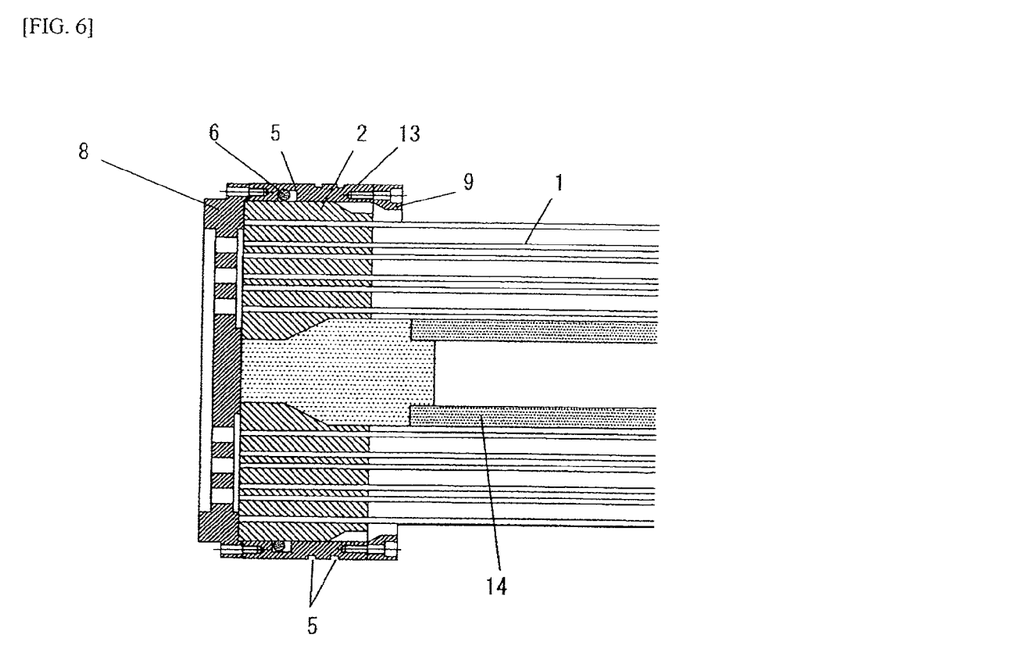
FIG. 6 is an enlarged cross-sectional view of the area around the tube sheet in the hollow fiber element shown in FIG. 5.

FIG. 6 is an enlarged view of a region near the tube sheet in the hollow fiber element shown in FIG. 5. As shown in FIG. 6, in the outer surface of tube sheet 2, cylindrical auxiliary member 13 which may be made of stainless steel is disposed such that tube sheet 2 can move along the axis of auxiliary member 13 within it. Perforated plate 8 serving as a tube sheet holder is disposed in contact with tube sheet 2, in the side opposite to the side to which core tube 14 of tube sheet 2 is connected. Perforated plate 8 can be held to auxiliary member 13 by a bolt (not shown). In the end of auxiliary member 13 in the side opposite to the side where perforated plate 8 is held, stopper 9 for limiting a moving distance of tube sheet 2 in relation to auxiliary member 13 toward the side opposite to perforated plate 8 is held via a bolt (not shown).

Perforated plate 8 receives a pressure from tube sheet 2 to act as a structure for preventing tube sheet 2 from deforming as described above, and may have the configuration as described in the above embodiments. However, in this embodiment, it is particularly preferable that the center and the periphery of perforated plate 8 contact tube sheet 2 to support tube sheet 2. Core tube 14 is disposed in the center of tube sheet 2, and therefore, when perforated plate 8 contact the center of tube sheet 2, perforated plate 8 directly supports the region of tube sheet 2 facing core tube 14, so that deformation of tube sheet 2 can be more effectively prevented. Specifically, it is suitable that the surface of perforated plate 8 facing tube sheet 2 contacts tube sheet 2 in 0 to 40% of the total surface area in the central region and 5 to 50% of the total surface area in the peripheral region and a concave portion having a depth of 1 mm or more as a permeate gas flow path occupies 10 to 95%, preferably 30 to 90% of the total surface area. Furthermore, in this embodiment, core tube 14 is disposed in the center of tube sheet 2, and therefore, by contacting perforated plate 8 with the center and the periphery of tube sheet 2, the whole opening region in hollow fiber membrane 1 can face the concave portion with a depth of 1 mm or more.

O-ring 6 serving as airtight-sealing means is disposed between the outer surface of tube sheet 2 and the inner surface of auxiliary member 13. O-ring 6 is held in O-ring holding groove 5 formed in the inner surface of auxiliary member 13. O-ring holding groove 5 is also formed in the outer surface of auxiliary member 13, and this O-ring holding groove 5 also holds an O-ring (not shown). This O-ring is tightly attached to the inner surface of vessel body 3 described below (see FIG. 7). Such a configuration allows airtightness to be maintained between the raw gas chamber and the permeate gas chamber. Positions of O-ring 6 and stopper 9 in relation to tube sheet 2 are as described above using FIG. 1.

Figure 7:
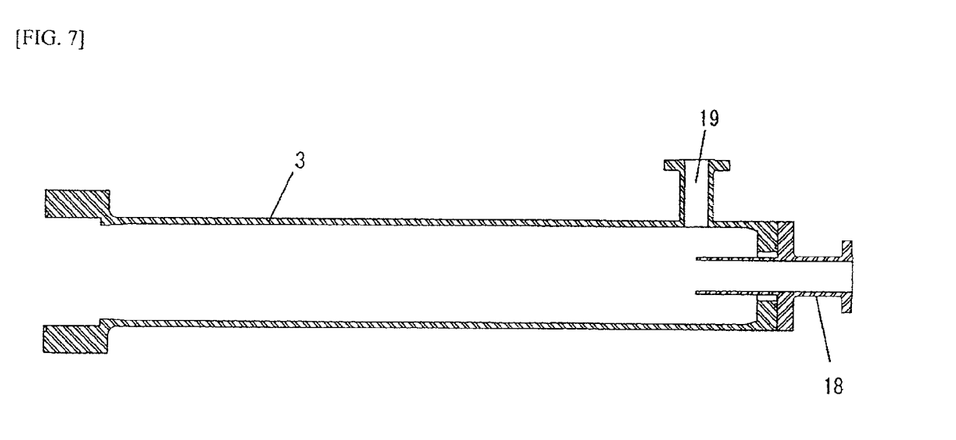
FIG. 7 is a cross-sectional view of an example of a vessel body into which the hollow fiber element shown in FIG. 5 is inserted.

FIG. 7 is a cross-sectional view of an example of a vessel body in which the above hollow fiber element is inserted. Vessel body 3 shown in FIG. 7 has an opening for taking the hollow fiber element in and out in one end and core tube holding member 18 which is connected to the open end of core tube 14 in the hollow fiber element (see FIG. 5) to hold core tube 14 and to guide a gas from the non-permeate gas flow path within core tube 14 to the outside of the vessel body. Mixed gas inlet 19 is disposed in the lateral side of vessel body 3. Vessel body 3 and core tube holding member 18 may be suitably made of a composite material such as a metal material and a fiber-reinforced resin.

Figure 8:
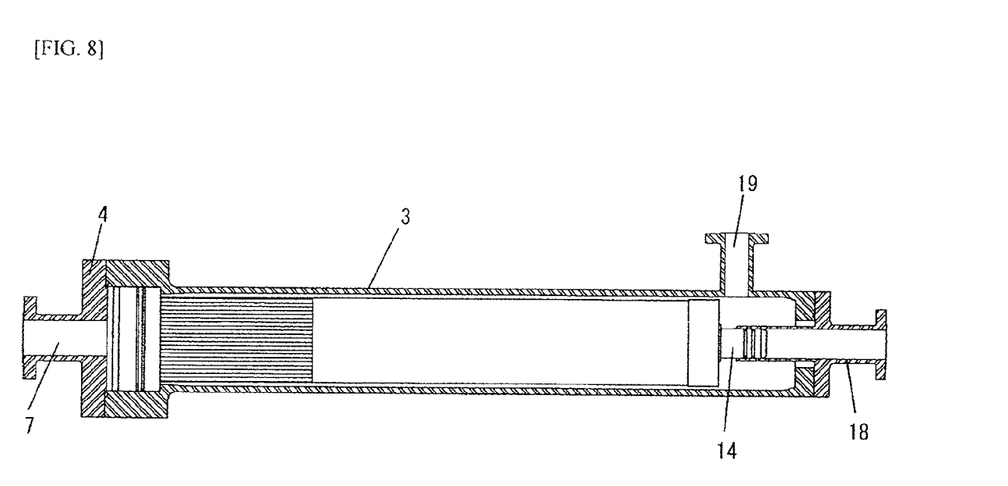
FIG. 8 shows the hollow fiber element in FIG. 5 and the gas separation membrane module having the vessel body in FIG. 7, where the vessel body and the lid are illustrated in their cross section.

In vessel body 3, a hollow fiber element is inserted as shown in FIG. 8 and thus, the hollow fiber element is housed in vessel body 3. In the open end of core tube 14 in the hollow fiber element, an O-ring is mounted in the outer surface of core tube 14, and the part in core tube 14 in which this O-ring is mounted is inserted into core tube holding member 18 within which a non-permeate gas flow path is formed. Thus, core tube 14 and core tube holding member 18 can be air-tightly and removably connected and the non-permeate gas flow paths of these can be communicated each other. In addition to direct connection, core tube 14 and core tube holding member 18 can be connected via a connecting member (not shown) as long as they are air-tightly connected. Furthermore, since core tube holding member 18 constitutes a part of the vessel, vessel 3 may have a structure where a certain part of vessel body 3 itself acts as core tube holding member 18, instead of forming core tube holding member 18 and vessel body 3 as separate members The non-permeate gas flow path in core tube holding member 18 may have any form as long as the gas is guided to the space outside of the vessel even if it is not directly communicated with the space outside of the vessel.

The opening of vessel body 3 housing the hollow fiber element is closed by lid 4 having permeate gas outlet 7. The opening of vessel body 3 can be closed with lid 4 by fixing lid 4 to vessel body 3 via a bolt. The hollow fiber element can be removed from and inserted into vessel body 3 by removing lid 4, and such a configuration allows the hollow fiber element to be easily replaced.

Figure 9:
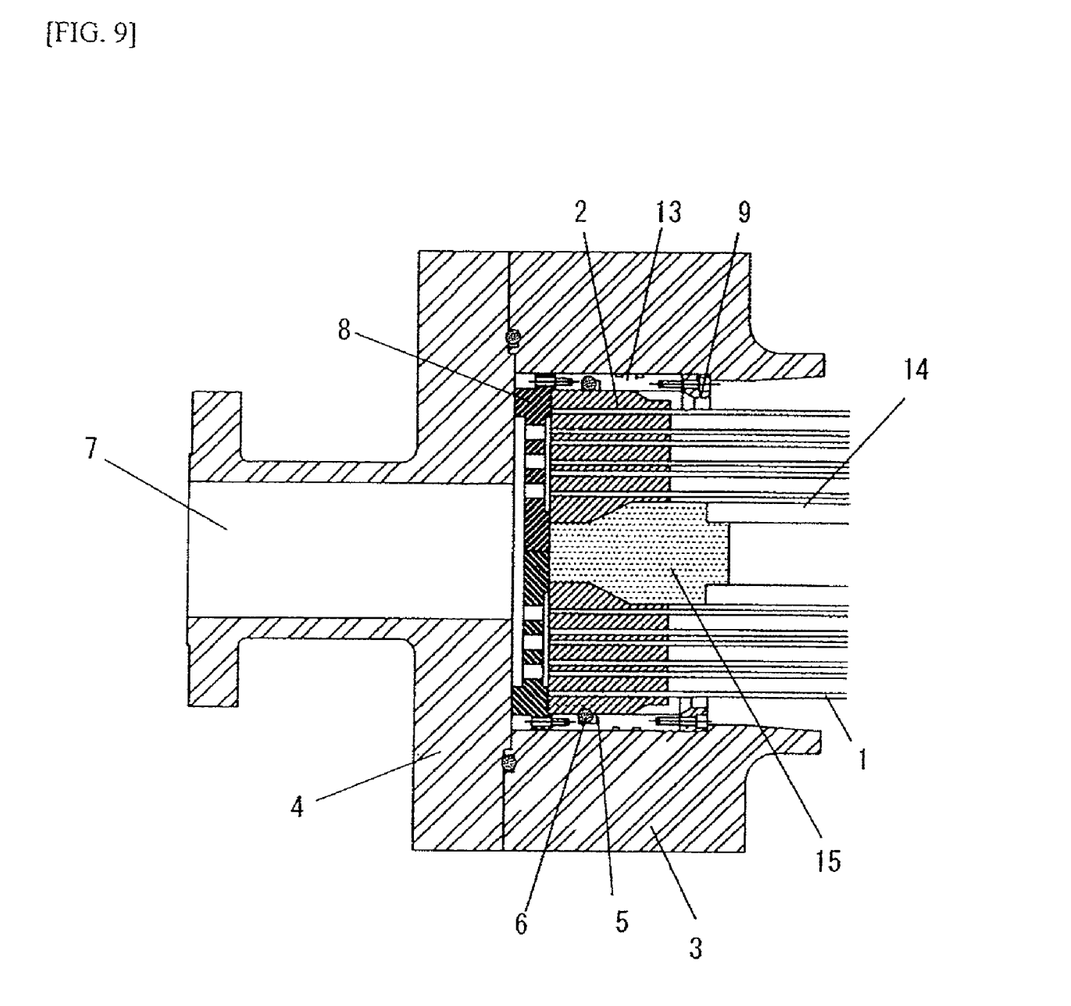
FIG. 9 is a cross-sectional view enlarging a supporting unit for a hollow fiber element in the vessel in the gas separation membrane module shown in FIG. 8.

FIG. 9 is a cross-sectional view enlarging a supporting unit for the hollow fiber element in the vessel in the gas separation membrane module having the configuration described above.

The configurations of vessel body 3 and lid 4 described above constituting the vessel housing the hollow fiber element in this embodiment can be also applied to vessel body 3 and lid 4 in the gas separation membrane module described with reference to FIGS. 1 to 4 in the same manner.

In the gas separation membrane module of this embodiment, a high-pressure mixed gas is introduced into the vessel from mixed gas inlet 19 during normal operation. The high-pressure mixed gas introduced from mixed gas inlet 19 flows through the outside of film member 11 toward tube sheet 2, and then enters film member 11 in the end of film member 11 facing tube sheet 2 and flows to the side opposite to tube sheet 2 while contacting the surface of hollow fiber membranes 1. During the flowing, a particular component contained in the mixed gas selectively permeates hollow fiber membranes 1. The permeate gas having selectively permeated hollow fiber membranes 1 flows through the inner space of hollow fiber membranes 1 and is collected in the permeate gas chamber through the openings of hollow fiber membranes 1, and discharged from permeate gas outlet 7 formed in lid 4. The remaining gas which does not permeate hollow fiber membranes 1 flows through perforations 16, enters the non-permeate gas flow path of core tube 14, flows through the non-permeate gas flow path and is discharged via core tube holding part 18 to the space outside of the vessel.

On the other hand, when tube sheet 2 receives a pressure in the reverse direction to that applied during normal operation and the pressure reaches a predetermined pressure or higher, the pressure initiates movement of tube sheet 2 within auxiliary member 13 in a direction getting away from perforated plate 8. When tube sheet 2 is separated from O-ring 6 held in the inner surface of auxiliary member 13 as it moves, airtightness between the permeate gas chamber and the raw gas chamber is broken and the gas in the permeate gas chamber leaks into the raw gas chamber. Thus, a pressure difference between the permeate gas chamber and the raw gas chamber is reduced, so that damage to tube sheet 2 can be prevented.

Although the structure of vessel body 3 in which a part of the inner surface is replaced by auxiliary member 13 has been described in the example shown in FIG. 1 for the gas separation membrane module of this embodiment described above, the structure in the example shown in FIGS. 2 to 4 can be applied to the auxiliary member as a structure breaking airtightness between the permeate gas chamber and the raw gas chamber by movement of tube sheet 2 as described in the above embodiment, even when auxiliary member 13 is used as in this embodiment.

Figure 10:
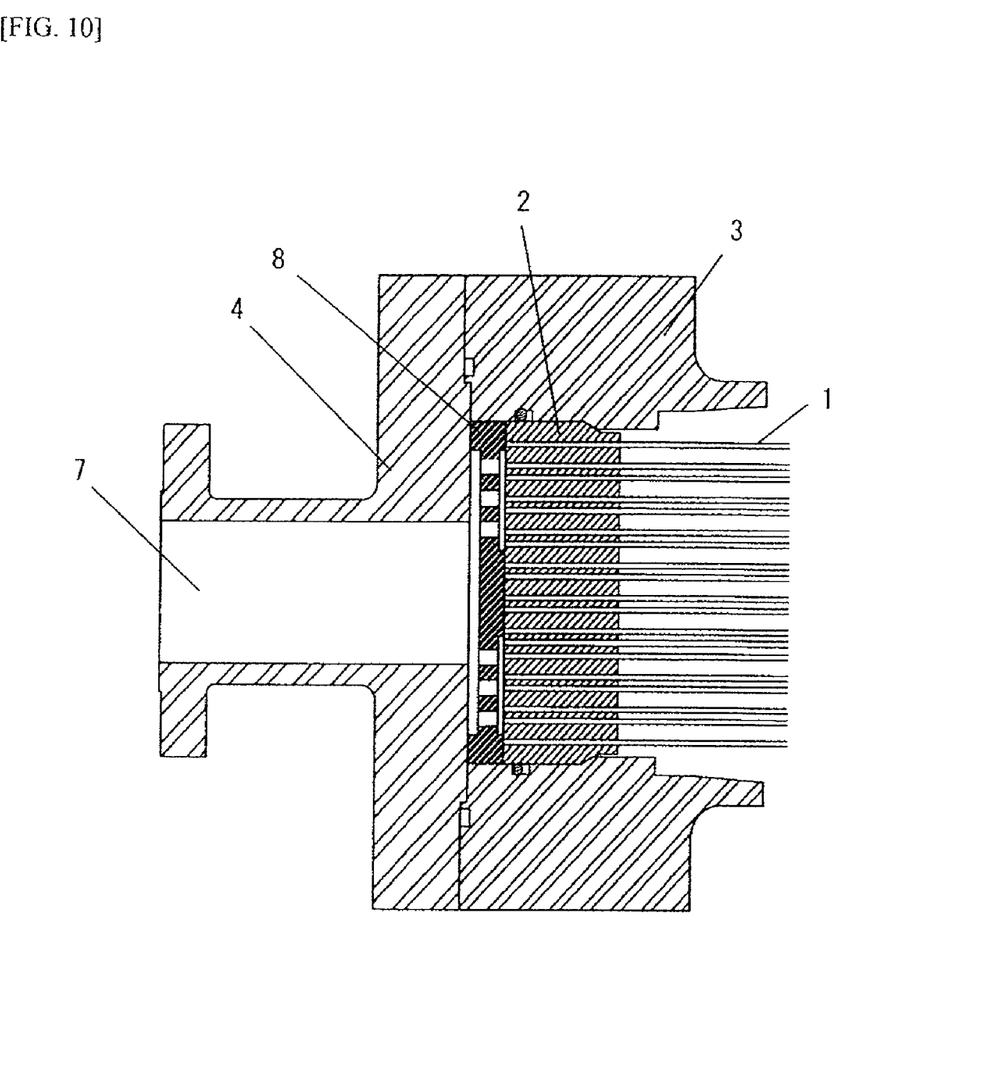
FIG. 10 is a cross-sectional view enlarging a supporting unit for a hollow fiber element in a vessel in a gas separation membrane module used in Experimental Example 1-2.

Furthermore, although in this embodiment, there has been described a configuration where tube sheet 2 can move in relation to vessel body 3 when tube sheet 2 receives a pressure in the reverse direction to that applied during normal operation, tube sheet 2 may be mounted in a manner that it does not move in relation to vessel body 3 as shown in FIG. 10. However, in such a case, it is necessary that perforated plate 8 is disposed in contact with the surface of tube sheet 2 facing the opening side of hollow fiber membranes 1 and a permeate gas is collected from the openings of hollow fiber membranes 1 via perforated plate 8 and a permeate gas flow path consisting of a concave portion having a depth of 1 mm or more is formed in a part of the surface of perforated plate 8 facing the tube sheet. When such a permeate gas flow path is formed in perforated plate 8, an additional structure such as core tube 14 shown in FIG. 5 may be added to the hollow fiber element.

The gas separation membrane module of the present invention has a simple but improved structure as described above, where risk of damage to the tube sheet or a hollow fiber is minimized even when a high-pressure gas is introduced and a gas separation efficiency is high, and therefore, can be suitably used to selectively separate and recover a particular gas component from a high-pressure mixed gas having a gauge pressure of about 0.1 to 30 MPa. Specifically, it can be particularly suitably used in applications where oxygen- or nitrogen-enriched air is selectively separated and recovered from air, hydrogen or helium is selectively separated and recovered from a mixed gas containing hydrogen or helium, or methane gas or carbon dioxide is selectively separated and recovered from a mixed gas containing methane gas and carbon dioxide.

There will be described Experimental Examples carried out in relation to the present invention.
Tube Sheet Damaging Experiment:

First, a tube sheet damaging experiment was carried out for the case that a tube sheet received a pressure in the reverse direction to that applied during normal operation.

EXPERIMENTAL EXAMPLE 1-1

Example 1-1 is an experiment in which using a gas separation membrane module having a structure described with reference to FIGS. 5 to 9, the presence of damage to tube sheet 2 was determined when tube sheet 2 received a pressure in the reverse direction to that applied during operation.

The hollow fiber element had, as shown in FIG. 5, hollow fiber membranes 1, tube sheet 2 in which the ends of hollow fiber membranes 1 were embedded, core tube 14 which was disposed along hollow fiber membranes 1 and held on tube sheet 2, auxiliary member 13 disposed in the outer surface of tube sheet 2, perforated plate 8 attached to auxiliary member 13, and a stopper attached to auxiliary member 13. Hollow fiber membrane 1 was made of a polyimide. Core tube 14 was made of an aluminum alloy. Tube sheet 2 was made of an epoxy resin having a size of 250 mm (diameter)×85 mm (thickness). Auxiliary member 13, perforated plate 8 and stopper 9 were made of stainless steel, and perforated plate 8 and stopper 9 were held to auxiliary member 13 via a bolt. A detail configuration of each of these members was as described above.

The hollow fiber element was inserted into vessel body 3 shown in FIG. 7, and the open end of core tube 14 was connected to core tube holding part 18. Then, as shown in FIG. 8, lid 4 was bolted to the opening of vessel body 3 in which the hollow fiber element was inserted, to construct a gas separation membrane module. Vessel body 3 and lid 4 were made of iron and steel.

In the gas separation membrane module thus constructed, a high-pressure mixed gas was introduced into vessel body 3 from mixed gas inlet 19 in vessel body 3. The introduced high-pressure mixed gas flows through the raw gas chamber while contacting the surface of hollow fiber membranes 1, through perforations 16 into core tube 14, and then discharged via core tube holding part 18 to the space outside of vessel body 3. On the other hand, a permeate gas having selectively permeated hollow fiber membranes 1 during the flow of the mixed gas contacting hollow fiber membranes 1 was collected in the permeate gas chamber through the openings in hollow fiber membranes 1 and discharged from the permeate gas outlet 7.

The gas separation membrane module described above was studied for the case that tube sheet 2 received a pressure in the reverse direction to that applied during operation. In this study, on the assumption of wrong operation of the gas separation membrane module, compressed air was fed from permeate gas outlet 7 with a pressure being gradually increased. When a pressure of the compressed air fed reached 0.2 MPa (gauge pressure), tube sheet 2 was moved and thus, airtightness between the permeate gas chamber and the raw gas chamber was broken, resulting in leak of the gas from the permeate gas chamber into the raw gas chamber. Although a pressure of the compressed air fed from permeate gas outlet 7 was continuously increased, a pressure difference between the permeate gas chamber and the raw gas chamber was not increased due to leak of the fed gas into the raw gas chamber, so that the hollow fiber element was not damaged.

EXPERIMENTAL EXAMPLE 1-2

In Experimental Example 1-2, a pressure causing damage to tube sheet 2 when tube sheet 2 received a pressure in the reverse direction to that applied during normal operation was determined as described in Example 1, using a gas separation membrane module constructed as described in Experimental Example 1-1 except that tube sheet 2 was immovably mounted in vessel body 3 as shown in FIG. 10. As a result, damage to tube sheet 2 was observed when compressed air was fed from permeate gas outlet 7 at a pressure of 3 MPa (gauge pressure).
Gas Separation Performance Experiment:

Then, an experiment for gas separation performance was conducted.

EXPERIMENTAL EXAMPLE 2-1

In Experimental Example 2-1, a hollow fiber element was inserted into vessel body 3 having mixed gas inlet 19 and core tube holding part 18 as shown in FIG. 8 through its opening, and then the opening of vessel body 3 was closed by lid 4 to prepare a gas separation membrane module. The hollow fiber element had a hollow fiber bundle consisting of polyimide asymmetric hollow fiber membranes ($P'O_2/P'N_2=6.5$) with a membrane area of 80 m², an epoxy resin tube sheet to which the hollow fiber bundle was bonded and a core tube attached to the tube sheet, and the periphery of the hollow fiber bundle was wrapped by a polyimide film member. A perforated plate was disposed, contacting the tube sheet. The perforated plate was made of stainless steel and 64 perforations with a diameter of 12 mm were pre-formed in the perforated plate. Furthermore, in the surface of the perforated plate contacting the tube sheet, a permeate gas flow path consisting of a concave portion with a depth of 3 mm was formed as shown in FIG. 6. The concave portion was formed such that an area of the region of the perforated plate contacting the tube sheet was 5% in the central part and 40% in the periphery to the total surface area of the perforated plate facing the tube sheet and an area of the region where the concave portion was formed was 55%.

To the above gas separation membrane module, compressed air was fed at various pressures, and a flow rate of a permeate gas, an oxygen concentration in the permeate gas, a flow rate of a non-permeate gas and an oxygen concentration in the non-permeate gas were determined. The measurement results are shown in Table 1. In Table 1, a feeding pressure of the compressed air is expressed as a gauge pressure.

TABLE 1

| Feeding pressure of compressed air (kgf/cm²) | Feeding rate of air (Nm³/h) | Flow rate of a permeate gas (Nm³/h) | Oxygen concentration in a permeate gas (Vol %) | Flow rate of a non-permeate gas (Nm³/h) | Oxygen concentration in a non-permeate gas (Vol %) |
|---|---|---|---|---|---|
| 1.5 | 64.0 | 3.0 | 37.3 | 61.0 | 20.1 |
| 3 | 65.7 | 4.7 | 44.2 | 61.0 | 19.1 |
| 5 | 68.4 | 7.4 | 47.3 | 61.0 | 17.7 |
| 10 | 74.9 | 13.9 | 48.5 | 61.0 | 14.6 |
| 15 | 81.1 | 20.1 | 47.6 | 61.0 | 12.1 |

EXPERIMENTAL EXAMPLE 2-2

In Experimental Example 2-2, gas separation performance was determined as described in Example 2-1 using a gas separation membrane module as described in Experimental Example 2-1, except that a permeate gas flow path consisting of a concave portion with a depth of 3 mm was not formed in the tube sheet. The results are shown in Table 2. In Table 2, a feeding pressure of compressed air is expressed as a gauge pressure as in Table 1.

TABLE 2

| Feeding pressure of compressed air (kgf/cm²) | Feeding rate of air (Nm³/h) | Flow rate of a permeate gas (Nm³/h) | Oxygen concentration in a permeate gas (Vol %) | Flow rate of a non-permeate gas (Nm³/h) | Oxygen concentration in a non-permeate gas (Vol %) |
|---|---|---|---|---|---|
| 1.5 | 64.1 | 3.1 | 36.9 | 61.0 | 20.1 |
| 3 | 65.4 | 4.4 | 43.1 | 61.0 | 19.3 |
| 5 | 67.6 | 6.6 | 45.8 | 61.0 | 18.2 |
| 10 | 73.3 | 12.3 | 46.6 | 61.0 | 15.7 |
| 15 | 80.3 | 19.3 | 44.9 | 61.0 | 13.3 |

Comparison of Experimental Example 2-1 and Experimental Example 2-2 indicates that the presence or the absence of the gas flow path consisting of a concave portion with a depth of 3 mm in the perforated plate has a little influence on gas separation performance at a pressure of the compressed air fed as high as about 1.5 kgf/cm², and has a suitable influence on a flow rate of a permeate gas and a concentration of he permeate gas at a higher pressure of 2 kgf/cm² or more. Specifically, it is demonstrated that when a high-pressure mixed gas is introduced, the permeate gas flow path consisting of a concave portion with a depth of 3 mm formed in the perforated plate improves an oxygen concentration in the permeate gas up to about 2.7% and maintains or improves a flow rate of the permeate gas obtained. It is generally known that when gases are separated by a gas separation membrane, a concentration of a permeate gas and a flow rate of a permeate gas are in an inverse relationship, but in Experimental Example 2-1, the structure of the perforated plate allows for maintaining or improving a flow rate of a permeate gas while significantly improving an oxygen concentration in the permeate gas.

The invention claimed is:

1. A shell feed type gas separation membrane module where a high-pressure mixed gas is fed to the outer space of hollow fiber membranes capable of separating gases for performing gas separation, comprising
a hollow fiber element,
a vessel removably housing said hollow fiber element, and
a perforated plate disposed within said vessel,
wherein said hollow fiber element comprises a hollow fiber bundle formed by binding up a number of said hollow fiber membranes which are folded in U-shape such that both end openings are aligned at one end, a tube sheet to which the opening ends of said hollow fiber membranes are bonded such that the ends of said hollow fiber membranes are open, and a core tube which is disposed substantially in the center of said hollow fiber bundle and bonded to said tube sheet at one end and has an internal non-permeate gas flow path communicating with the outer space of said hollow fiber membranes within said vessel,
wherein said vessel comprises a vessel body comprising an opening through which said hollow fiber element is taken in and out, a core tube holding part which holds the other end of said core tube and which guides a gas from a non-permeate gas flow path in said core tube to the outside of said vessel and a mixed gas inlet, and a lid for shutting the opening in said vessel body having a permeate gas outlet, and
wherein said perforated plate is placed between said hollow fiber element and said lid such that at least a part of the surface facing the tube sheet side is in contact with said tube sheet and a non-contacting part of the surface facing the tube sheet side has a concave portion with a depth of 1 mm or more as a permeate gas flow path.

2. The gas separation membrane module according to claim 1, wherein said perforated plate is mounted such that the central part and the periphery of said perforated plate is in contact with said tube sheet.

3. The gas separation membrane module according to claim 1 or 2, wherein the outside of said hollow fiber bundle except the region around said tube sheet is covered by a film member which is substantially gas-impermeable.

4. The gas separation membrane module according to claim 1, wherein said mixed gas inlet is disposed near the end of said vessel body opposite to the side where the tube sheet in said hollow element is placed.

5. A shell feed type gas separation membrane module for separating gases from a high-pressure mixed gas fed to the outer space of hollow fiber membranes capable of separating gases, where a perforated plate is disposed in contact with the surface of a tube sheet bonded to the ends of said hollow fiber membranes such that the ends of said hollow fiber membranes are open and a permeate gas having permeated said hollow fiber membranes is collected from the openings in said hollow fiber membranes via said perforated plate, wherein a part of the surface of said perforated plate facing said tube sheet has a concave portion with a depth of 1 mm or more as a permeate gas flow path.

* * * * *